(12) United States Patent
Suga et al.

(10) Patent No.: US 8,132,310 B2
(45) Date of Patent: Mar. 13, 2012

(54) WORK CARRIER AND WORK CLAMPING METHOD USING THE SAME

(75) Inventors: Fumiaki Suga, Tokyo (JP); Toshihiro Tsuji, Tokyo (JP); Mitsuo Maeda, Tochigi (JP); Yuichi Wakabayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 856 days.

(21) Appl. No.: 12/162,258

(22) PCT Filed: Dec. 28, 2006

(86) PCT No.: PCT/JP2006/326416
§ 371 (c)(1),
(2), (4) Date: Sep. 8, 2008

(87) PCT Pub. No.: WO2007/088697
PCT Pub. Date: Aug. 9, 2007

(65) Prior Publication Data
US 2009/0016861 A1 Jan. 15, 2009

(30) Foreign Application Priority Data
Feb. 1, 2006 (JP) .................................. 2006-025138

(51) Int. Cl.
*B25B 27/14* (2006.01)
(52) U.S. Cl. ........... 29/281.1; 269/66; 269/37; 29/281.5
(58) Field of Classification Search ................. 29/281.1, 29/281.3, 281.5; 269/37, 59, 58, 66, 68, 269/74, 90, 166
See application file for complete search history.

(56) References Cited

U.S. PATENT DOCUMENTS
2,803,872 A * 8/1957 Massa ............................. 269/37
2,827,690 A * 3/1958 Brown ............................ 269/17
2001/0032772 A1 10/2001 Oldford et al.

FOREIGN PATENT DOCUMENTS
JP 6-1158 U 1/1994
JP 11-348777 12/1999

* cited by examiner

*Primary Examiner* — Lee D Wilson
*Assistant Examiner* — Jamal Daniel
(74) *Attorney, Agent, or Firm* — Birch, Stewart, Kolasch & Birch, LLP

(57) ABSTRACT

A work carrier includes a movable clamp unit (15) having resiliently connected first and second sliders (26, 27) mounted on a guide rail (24), a lock lever (37) mounted on the second slider and normally urged in a direction to move a toothed portion (41) into meshing engagement with a rack (25), an operating lever (46) pivotally mounted on the second slider, and a cam mechanism (43, 38, 44, 45) operable in response to pivotal movement of the operating lever in one direction such that the second slider is locked in position against movement relative to the guide rail via meshing engagement between the toothed portion and the rack and, subsequently, the first slider and clamp member carried thereon are forcibly displaced away from the second slider while the second slider remains locked on the guide rail.

8 Claims, 7 Drawing Sheets

WORK CARRIER AND WORK CLAMPING METHOD USING THE SAME

TECHNICAL FIELD

The present invention relates to a work carrier for carrying a plate-like work, such as vehicle door, with the work held in an upright position and also to a method of clamping the plate-like work using the work carrier.

BACKGROUND ART

Work carriers of the type concerned are used in an automobile assembly line for conveyance of a plate-like work, such as vehicle door, to an assembling station where a window glass and other parts are assembled with the door, or to a desired station in another processing line. Typical examples of such work carriers are disclosed in Japanese Utility Model Registration No. 2571180 (corresponding to JP 6001158U) and Japanese Patent Laid-Open Publication No. HEI 11-348777 (JP 1134877 A).

The work carrier disclosed in JP 6001158U includes a fixed clamp member disposed on a base and a movable clamp member disposed via a bracket on the base so that a vehicle door can be clamped at opposite vertical edges thereof by and between the fixed and movable clamp members. The movable clamp member is integrally connected to a slide rod slidably mounted via a compression coil spring to the upper end of a support lever, the lower end of the support lever being pivotally connected to the bracket. The support lever is driven by a link mechanism to undergo pivotal movement toward and away from the fixed clamp member. When the support lever is driven to move toward the fixed clamp member, the movable clamp member is forced into pressure contact with one vertical edge of the door to the extent that an opposite vertical edge of the door is forced against the fixed clamp member. Thus, the door is clamped between the fixed and movable clamp members under the force of the compression coil spring. When the support lever is moved away from the fixed clamp member, the movable clamp member is disengaged from the vertical edge of the door.

The work carrier of the foregoing construction is not fully satisfactory in that when subjected to a relatively large horizontal force occurring at the starting and stopping of the work carrier, the door is likely to be displaced from a desired clamped position against the force of the compression coil spring, resulting in inaccurate assembly of the vehicle door. An attempt to increase the spring constant of the compression coil spring may damage the vehicle door.

Figure 7A:
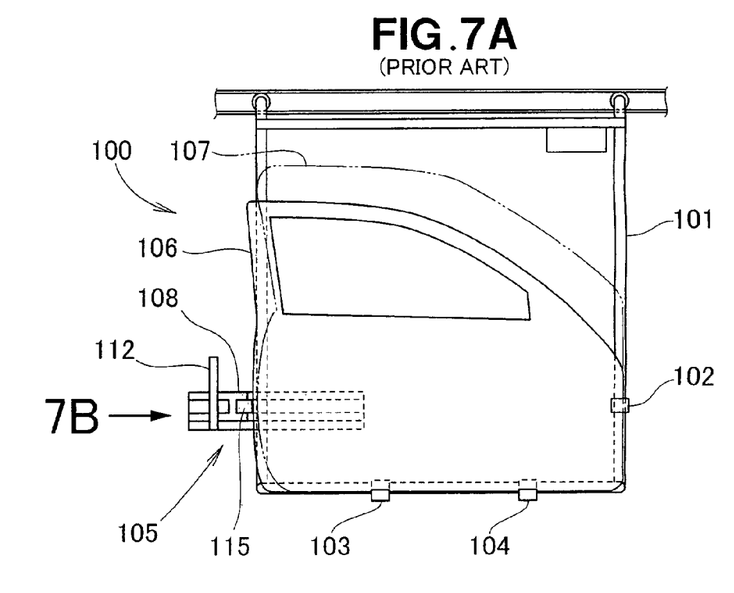
FIG. 7A is a front elevational view showing a conventional vehicle door carrier.
Figure 7B:
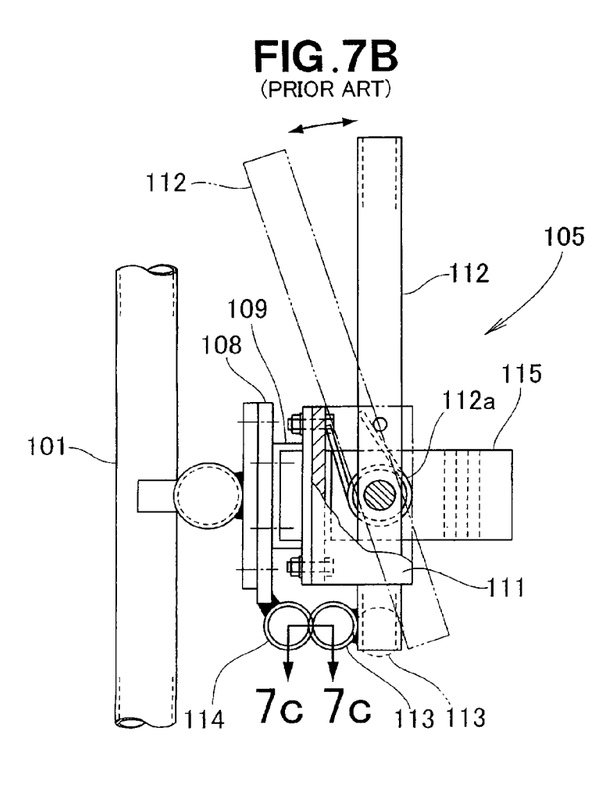
FIG. 7B is a view looking in a direction of the arrow 7B shown in FIG. 7A.
Figure 7C:
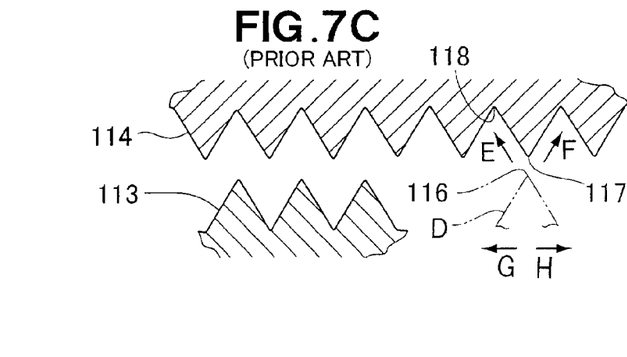
FIG. 7C is a cross-sectional view taken along line 7C-7C of FIG. 7B.

The work carrier disclosed in JP 1134877 A includes, as shown in FIGS. 7A to 7C hereof, a rectangular frame-like hanger 101 on which a fixed clamp unit 102, retainer members 103, 104 and a movable clamp unit 105 are arranged so that a vehicle door 106 can be clamped at opposite vertical edges thereof by and between the fixed clamp unit 102 and the movable clamp unit 105 with a lower edge thereof supported on the retainer members 103, 104. The movable clamp unit 105 includes a horizontally elongated support plate 108 mounted to a vertical frame of the hanger 101, and a slider 111 (FIG. 7B) slidably mounted on a guide member 109 attached to the support plate 108. An operation lever 112 is pivotally connected to the slider 111 and includes a screw member 113 connected to a lower end thereof for meshing engagement with a screw member 114 (FIG. 7B) provided on the support plate 108. The operation lever 112 is normally urged by a torsion coil spring 112a (FIG. 7B) in a direction to move the screw member 113 into meshing engagement with the screw member 114 on the support plate 108. The slider 111 is connected to a movable clamp member 115.

With this arrangement, when a vehicle door 106 is to be carried on the work carrier 100, the operation lever 112 is turned counterclockwise in FIG. 7B to thereby disengage the screw member 113 from the screw member 114 on the support plate 108. The slider 111 can now be moved along the guide member 109. While keeping this condition, the operation lever 112 is displaced in a direction parallel to an axis of pivotal movement thereof so that the movable clamp member 115 connected to the slider 111 is moved away from the fixed clamp unit 102. After the vehicle door 106 is placed on the retainer members 103, 104 with its one vertical edge held by the fixed clamp unit 102, the operation lever 112 is displaced in the opposite direction to move the slider 111 along the guide member 109 until the movable clamp member 115 comes into engagement with an opposite vertical edge of the vehicle door 106. Then a grip on the operation lever 112 is released whereupon the operation lever 112 is allowed to return to its original position (indicated by the solid lines shown in FIG. 7B) under the force of the torsion coil spring 112a, causing the screw member 113 to move into meshing engagement with the screw member 114 on the support plate 118. Thus, the movable clamp member 115 is locked in position against movement relative to the guide member 109, and the vehicle door 106 is clamped between the fixed and movable clamp units 102 and 105. Reference numeral 107 shown in FIG. 7A denotes another vehicle door of enlarged size that can be carried on the work carrier 100.

However, a problem may occur when the screw member 113 on the operation lever 112 comes into meshing engagement with the screw member 114 on the support plate 108. Especially when the screw member 113 approaches the screw member 114 with its tooth tips 116 (only one shown by phantom lines D shown in FIG. 7C) aligned with tooth tips 117 of the screw member 114, the tooth tips 117 of the screw member 113 move to slide either along left-side tooth flanks of the screw member 114 as indicated by the arrow E, or along right-side tooth flanks of the screw member 114 as indicated by the arrow F, as the screw member 113 is forced toward the screw member 114 by the force of the torsion coil spring 112a. As a consequence, the screw member 113 is axially displaced relative to the screw member 114 either in a direction indicated by the arrow G or in a direction indicated by the arrow H.

In the former case, since the movement of the screw member 113 in the direction of the arrow G is limited by the vehicle door 106 clamped between the fixed and movable clamp units 102 and 105, the tooth tips 116 of the screw member 113 stop moving along the left tooth flanks of the screw member 114 before they reach tooth bottoms 118 of the screw member 114. Due to insufficient meshing engagement between the screw members 113 and 114, the movable clamp unit 105 cannot firmly hold the vehicle door edge, allowing the vehicle door 106 to become displaced or wobbled when subjected to a relatively large horizontal force during conveyance by the work carrier 100. Alternatively, when the screw member 113 is displaced in the direction of the arrow H, there is created between the movable clamp member 115 and the mating edge of the vehicle door 106 a space corresponding in amount to one-half pitch of the screw member 113. The thus created space allows horizontal movement or wobbling of the vehicle door occurring during conveyance by the work carrier, which will hinder smooth and accurate assembling of a window glass and other parts relative to the vehicle door.

It is accordingly an object of the present invention to provide a work carrier, which is capable of carrying a plate-like work, such as vehicle door, with the work held in a firmly clamped condition without causing objectionable displacement or wobbling during conveyance thereof.

Another object of the present invention is to provide a work clamping method using the work carrier.

DISCLOSURE OF THE INVENTION

According to a first aspect of the present invention, there is provided a work carrier for carrying a plate-like work with the work held in an upright position, the work carrier comprising: a fixed clamp unit having a first clamp member for holding a vertical edge of the work; and a movable clamp unit having a second clamp member disposed opposite to the first clamp member for holding another vertical edge of the work, wherein the movable clamp unit comprises: a horizontal guide rail mounted to extend toward the first clamp member; a rack extending parallel to the guide rail; a first slider and a second slider that are slidably mounted on the guide rail with the first slider situated nearer the first clamp member in relation to the second slider, the first slider supporting thereon the second clamp member; a resilient member resiliently connecting together the first slider and the second slider; a lock lever pivotally mounted on the second slider and having a toothed portion engageable with the rack for locking the second slider in position against movement relative to the guide rail; a spring member acting between the second slider and the lock lever and urging the lock lever to turn in a first direction to move the toothed portion of the lock lever into meshing engagement with the rack; an operating lever pivotally mounted on the second slider to undergo pivotal movement between a first position and a second position through a third position disposed between the first and second positions; and a cam mechanism operable in response to pivotal movement of the operating lever such that when the operating lever is in the first position, the lock lever is urged to turn in a second direction opposite to the first direction against the force of the spring member so as to disengage the toothed portion from the rack to thereby allow the first and second sliders to be displaced toward and away from the first clamp member, when the operating lever is in the third position, the lock lever is allowed to turn in the first direction under the force of the spring member to the extent that the toothed portion is in complete mesh with the rack to thereby lock the second slider in position against movement relative to the guide rail, and when the operating lever is in the second position, the first slider and the second clamp member are displaced toward the first clamp member against the resiliency of the resilient member while the second slider remains locked in position on the guide rail via meshing engagement provided between the rack and the toothed portion under the force of the spring member.

With this arrangement, in response to pivotal movement of the operating lever in a direction to advance the operating lever from the first position toward the second position, the cam mechanism operates to forcibly move the first slider and the second clamp member supported thereon in a direction toward the first clamp member of the fixed clamp unit while the second slider remains locked in position on the guide rail. With this forcible movement of the second clamp member toward the first clamp member, the plate-like work can be firmly clamped between the first clamp member of the fixed clamp unit and the second clamp member of the movable clamp unit even if the second slider has been locked in position on the guide rail with the second clamp member spaced from the mating vertical edge of the plate-like work by a distance equal to one-half pitch of the teeth of the rack and the tooth portion of the lock lever. In this clamped condition, the first slider is prevented from moving in a direction away from the first clamp member with the result that the second clamp member supported on the first slider is held in a desired clamping position even when subjected to a severe horizontal force that may occur at the starting and stopping of the work carrier. Thus, the plate-like work clamped between the fixed and movable clamp units can remain in a desired position throughout the conveyance by the work carrier.

Preferably, the cam mechanism includes a first cam surface formed on the first slider, a second cam surface formed on the lock lever, and a first cam roller and a second cam roller that are rotatably mounted on the operating lever for rolling engagement with the first cam surface and the second cam surface, respectively. The first and second cam surfaces and the first and second cam rollers are arranged to move into and out of engagement with each other in response to pivotal movement of the operating lever so as to concurrently control pivotal movement of the lock lever and displacement of the first slider relative to the second slider.

In one preferred form of the invention, the first cam surface is contoured into a step-like configuration and has a first section and a second section contiguous to the first section and spaced a smaller distance from a pivot axis of the operating lever than the first section, and the second cam surface is contoured into a step-like configuration and has a first section and a second section contiguous to the first section and spaced a larger distance from the pivot axis of the operating lever than the first section of the second cam surface. When the operating lever is in the first position, the first cam roller is out of engagement with either of the first and second sections of the first cam surface while the second cam roller is in engagement with the first section of the second cam surface. When the operating lever is in the third position, the first cam roller is in engagement with the first section of the first cam surface while the second cam roller is in engagement with the second section of the second cam surface. When the operating lever is in the second position, the first cam roller is in engagement with the second section of the first cam surface while the second cam roller is out of engagement with either of the first and second sections of the second cam surface.

Preferably, the second section of the first cam surface is spaced a first distance from the pivot axis of the operating lever, and the first section of the first cam surface is spaced a second distance from the pivot axis of the operating lever, the first distance is smaller than the first distance at least by a distance which is equal to one-half pitch of teeth of the rack and the toothed portion of the lock lever. This arrangement is particularly effective to set off or cancel displacement of the second clamp member in a direction away from the mating vertical edge of the plate-like work that may occur when tooth tips of the toothed portion are aligned with tooth tips of the rack during pivotal movement of the lock lever in a direction to move the toothed portion into meshing engagement with the rack.

Preferably, the first and second sections of the first cam surface and the first and second sections of the second cam surface have a circular arc-shaped configuration.

The operating lever preferably has a first grip portion for gripping by a human operator to turn the operating lever in a first direction to move the operating lever from the first position through the third position to the second position for clamping the work, and a second grip portion for gripping by the human operator to turn the operating lever in a second direction opposite to the first direction to cause the operating lever to return from the second position to the first position for unclamping the work. The second grip portion is disposed below the first grip portion and extending at an angle to the first grip portion such that when the operating lever is in the second position, the first grip portion lies in a substantially vertical plane and the second grip portion lies in a substantially horizontal plane.

This arrangement allows the human operator to move the operating lever from the second position to the first position with smaller muscular effort because a downward force which is required to turn the operating lever in the second direction by depressing the second grip portion is much smaller than a horizontal force which is required to turn the operating lever in the second direction by turning the first grip portion in the second direction.

According to another aspect of the present invention, there is provided a method of clamping a plate-like work using the work carrier of the foregoing construction, the method comprising the steps of: while the operating lever is kept in the first position, pulling the operating lever in a first horizontal direction to move the first and second sliders concurrently in a backward direction away from the first clamp member until that the second clamp member is spaced from the first clamp member by a distance large enough to accommodate a plate-like work to be carried on the work carrier; then, placing the plate-like work on the work carrier such that the plate-like work is accommodated within a space defined between the first and second clamp members with one vertical edge of the plate-like work held by the first clamp member; subsequently, while the operating lever is kept in the first position, forcing the operating lever in a second horizontal direction to advance the first and second sliders concurrently toward the first clamp member (13) until that the second clamp member comes in abutment with another vertical edge of the plate-like work; then, turning the operating lever in a first direction to move the operating lever from the first position to the third position to thereby cause the cam mechanism to operate in such a manner as to allow the lock lever to turn in a direction under the force of the spring member to the extent that the toothed portion is in complete mesh with the rack to thereby lock the second slider in position against movement relative to the guide rail; and finally further turning the operating lever in the first direction to move the operating lever from the third position to the second position to thereby cause the cam mechanism to operate in such a manner as to forcibly displace the first slider and the second clamp member toward the first clamp member against the resiliency of the resilient member while the second slider remains locked in position on the guide rail via meshing engagement provided between the rack and the toothed portion under the force of the spring member, thereby clamping the plate-like work between the first and second clamp members.

Since the first slider and the second clamp member are forcibly displaced toward the first clamp member while the second slider remains locked in position on the guide rail via meshing engagement provided between the rack and the toothed portion, it is possible to firmly clamp plate-like work between the clamp member of the fixed clamp unit and the clamp member of the movable clamp unit.

Preferably, the amount of displacement of the first slider and the second clamp member resulting from pivotal movement of operating lever from the third position to the second position is at least equal to one-half pitch of the teeth of the rack and the tooth portion of the lock lever.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

Figure 1:
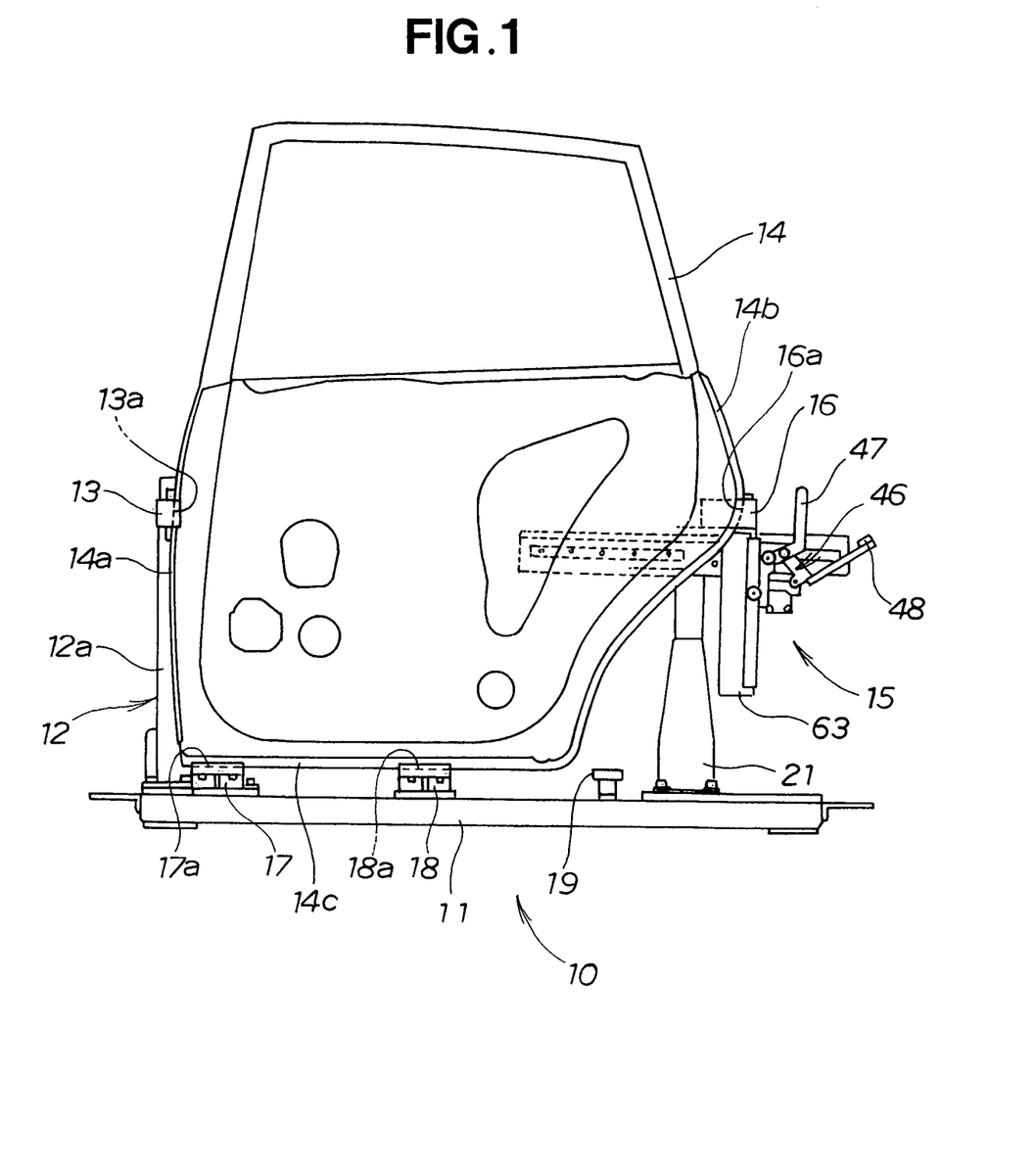
FIG. 1 is a front elevational view of a work carrier according to an embodiment of the present invention.

As shown in FIG. 1, a work carrier 10 embodying the invention takes the form of a door pallet used in an automobile assembly line. The door pallet (work carrier) 10 includes a horizontal base 11, a front clamp unit 12 disposed on one end (left end in FIG. 1) of the base 11 and having a clamp member 13 for holding a front vertical edge 14a of a vehicle door 14, a rear clamp unit 15 disposed on the other end (right end in FIG. 1) of the base 11 and having a clamp member 16 for holding a rear vertical edge 14b of the vehicle door 14, and a plurality (three in the illustrated embodiment) of support members 17, 18 and 19 disposed on the base 11 between the front and rear clamp units 12 and 15 for supporting thereon a lower edge 14c of the vehicle door 14.

The clamp member 13 of the front clamp unit 12 has a groove 13a facing toward the clamp member 16 of the rear clamp unit 15. The groove 13a has a shape complementary in contour to the shape of the front vertical edge 14a of the vehicle door 14 so that the front vertical door edge 14a can be snugly received in the groove 13a of the clamp member 13. Similarly, the clamp member 16 of the rear clamp unit 15 has a groove 16a facing toward the clamp member 13 of the front clamp unit 12 and having a shape complementary in contour to the shape of the rear vertical edge 14b of the vehicle door 14 so that the rear vertical door edge 14b can be snugly received in the groove 16a of the clamp member 16. Likewise, the support members 17 and 18 have grooves 17a and 18a formed in respective upper surfaces thereof for receiving therein the lower edge 14c of the vehicle door 14. The support member 19 has a flat upper surface for sliding contact with the lower door edge 14c.

The front clamp unit 12 comprises a vertical support column 12a fixedly mounted on the left end portion of the base 11, and the clamp member 13 fixedly mounted on an upper portion of the support column 12a. The front clamp unit 12 and the clamp member 13 will be hereinafter referred to as "fixed clamp unit 12" and "fixed clamp member 13", respectively, as they are fixed in position relative to the base 11.

Figure 2:
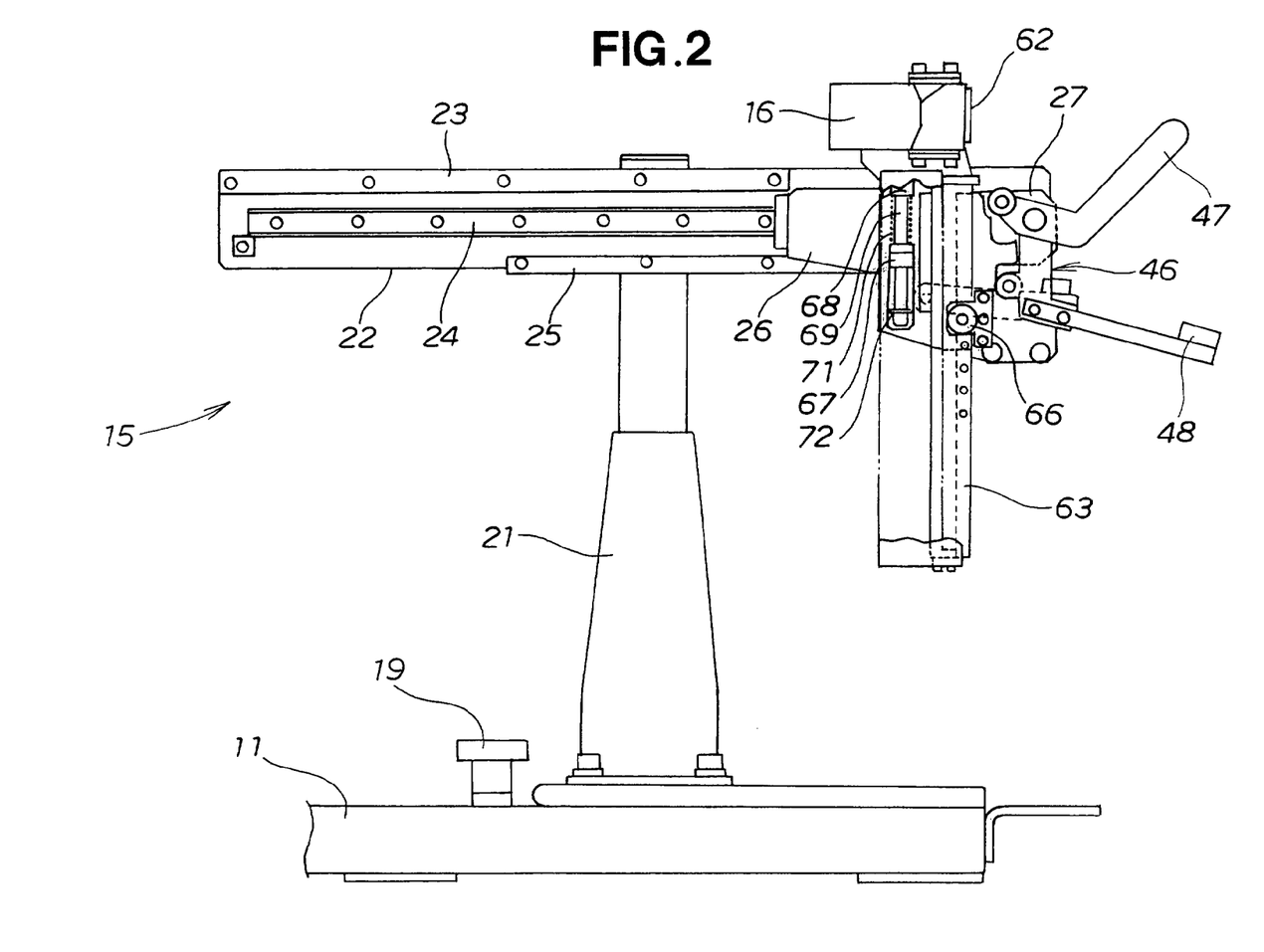
FIG. 2 is an enlarged front elevational view showing a movable clamp unit of the work carrier.

As shown in FIG. 2, the rear clamp unit 15 generally comprises a vertical support column 21 fixedly mounted on the right end portion of the base 11, a horizontal support plate 22 of elongated rectangular shape supported on an upper end portion of the support column 21, a guide block 23 mounted to the support plate 22 and extending along an upper longitudinal edge of the support plate 22, a guide rail 24 mounted to the support plate 22 and extending along a longitudinal central portion of the support plate 22, a rack 25 mounted to the support plate 22 and extending along a lower longitudinal edge of the support plate 22, and first and second sliders 26 and 27 that are slidably mounted in tandem relation on the guide rail 24 with the first slider 26 situated nearer the fixed clamp member 13 in relation to the second slider 27. The guide rail 24 is mounted to extend horizontally toward the fixed clamp member. The guide block 23 and the rack 25 extend parallel to the guide rail 24. The rack 25 has a row of teeth formed on and along a lower longitudinal edge thereof.

Figure 3:
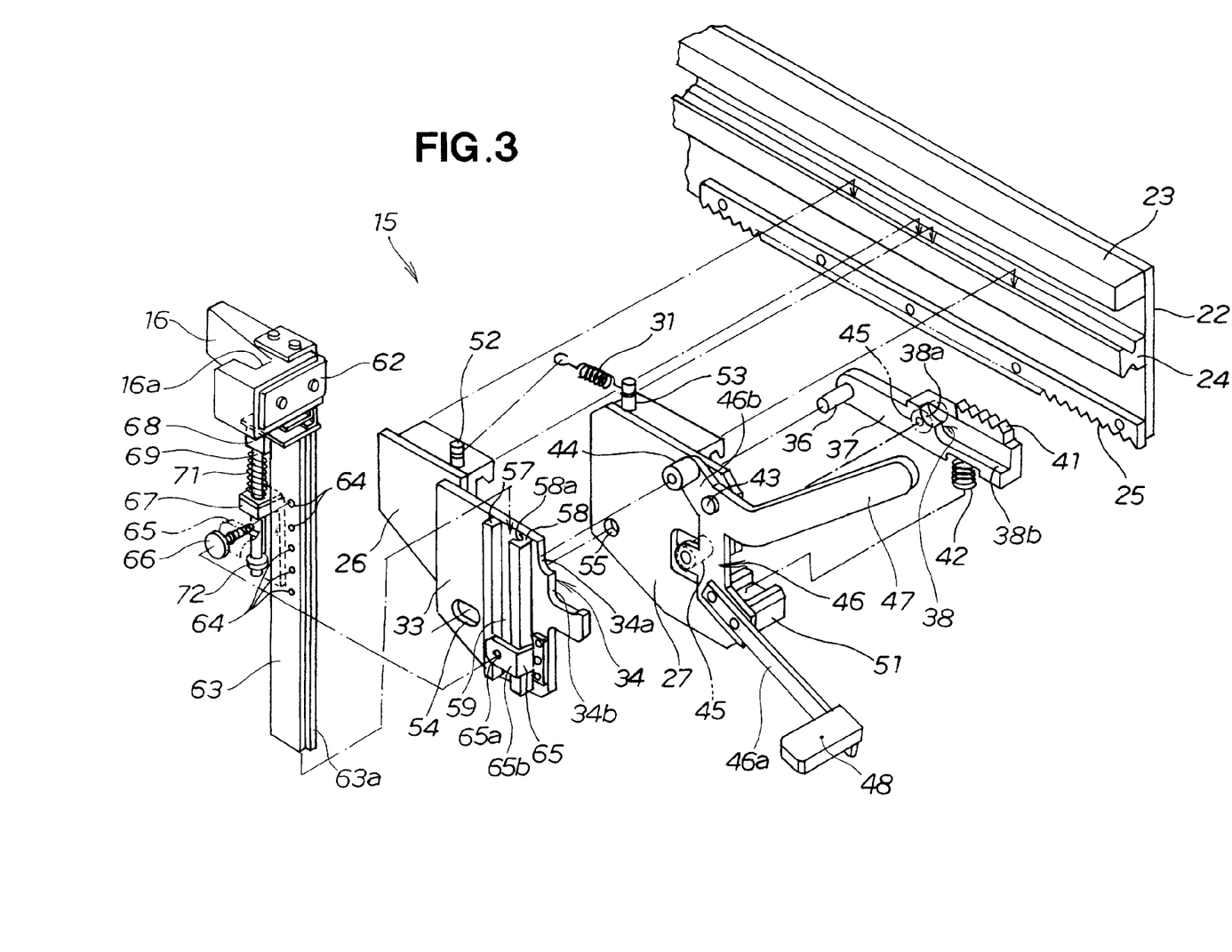
FIG. 3 is an exploded perspective view of a main portion of the movable clamp unit.

As shown in FIG. 3, the first slider 26 and the second slider 27 are resiliently connected together by a resilient connecting member 31. In the illustrated embodiment, the resilient connecting member 31 comprises a tension coil spring having one end connected to a vertical retainer pin 52 on the first slider 26 and an opposite end connected to a vertical retainer pin 53 on the second slider 27. The tension coil spring 31 may be replaced by an elastic cord (not shown). The first slider 26 has an extension plate 33 formed integrally with a body of the first slider 26 and extending in overlapping relation to the second slider 27. The extension plate 33 supports thereon the clamp member 16 of the rear clamp unit 15. The clamp member 16 mounted on the guide rail 24 via the first slider 26 is movable toward and away from the clamp member 13 of the fixed clamp unit 12 and, accordingly, the clamp member 16 and the rear clamp unit 15 including the clamp member 16 are hereinafter referred to as "movable clamp member 16" and "movable clamp unit 15", respectively.

The movable clamp member 16 is connected to an end (upper end in FIG. 3) of an elongated support plate 63 by means of a joint member 62. The support plate 63 is slidably received in a guide channel 59 defined between a pair of parallel spaced vertical guide members 57 and 58 provided on a front surface of the extension plate 33. The support plate 63 has a guide rib 63a extending along a longitudinal edge thereof. The guide rib 63a is slidably received in a longitudinal guide groove 58a formed in an inner side surface of the guide member 58 so that the support plate 63 is prevented from displacing off from the guide channel 59 toward the front face side of the extension plate 33.

The support plate 63 is normally locked in position relative to the extension plate 33 by means of a lock pin 66. The lock pin 66 is inserted through a hole 65a in an L-shaped stay 65 into one of holes 64 formed in the support plate 63. The L-shaped stay 65 is attached to the extension plate 33 and has an arm 65b extending transversely across over the guide channel 59, and the hole 65a is formed in the arm 65b and aligned with a longitudinal centerline of the guide channel 59. The holes 64 formed in the support plate 63 are spaced at regular intervals in a longitudinal direction of the support plate 63. By properly selecting one of the holes 64 into which the lock pin 66 is to be inserted, it is possible to adjustably set the vertical position of the movable clamp member 16. The movable clamp member 16 is normally urged upwardly by means of a compression coil spring 71 disposed between a spring retainer 68 located near the joint member 62 and a horizontal arm of an L-shaped stay 67 attached to the extension plate 33. The compression coil spring 71 is loosely fitted around a guide rod 69 provided to extend downward from the spring retainer 68 through the horizontal arm of the L-shaped stay 67. A stopper ring 72 is attached to a lower end of the guide rod 69 for preventing the support plate 63 from being removed upward from the guide channel 59. With this arrangement, since the force of the compressing coil spring 71 acts in a direction to cancel the effect of a combined weight of the clamp member 16 and the support plate 63, adjustment of the vertical position of the clamp member 16 can be achieved easily and smoothly.

The extension plate 33 of the first slider 26 has a cam surface 34 formed on an upper edge thereof. The first cam surface 34 is contoured into a step-like configuration having a first section 34a and a second section 34b contiguous to the first section 34a and located rearward (rightward in FIG. 3) of the first section 34a. The first and second cam surface sections 34a, 34b are of circular arc configuration.

The movable clamp unit 15 further includes a lock lever 37 pivotally mounted on the second slider 27 and having a toothed portion 41 engageable with the rack 25 on the support plate 22 for locking the second slider 27 in position against displacement relative to the guide rail 24. For pivotal movement in a vertical plane, the lock lever 37 has a pivot pin 36 provided at one end thereof. The pivot pin 36 is disposed horizontally, extends through a round hole 55 formed in the second slider 27, and is received in an elongate hole 54 formed in the extension plate 33 of the first slider 26. The toothed portion 41 is formed on an upper edge of a distal end portion of the lock lever 37. The toothed portion 41 has a series of teeth which are identical in shape with teeth of the rack 25.

The lock lever 37 is urged by a spring member 42 to turn in the counterclockwise direction in FIG. 3 about an axis of the pivot pin 36. In the illustrated embodiment, the spring member 42 comprises a compression coil spring acting between a retainer bracket 51 on the second slider 27 and a lower edge of the distal end portion of the lock lever 37. The thus provided spring member 42 urges the lock lever 37 to turn about the axis of the pivot pin 36 in the counterclockwise direction (first direction) in FIG. 3 to move the toothed portion 41 into meshing engagement with the rack 25 on the support plate 22. The compression coil spring 42 may be replaced by a block of elastic material such as rubber.

The lock lever 37 further has a cam surface 38 formed on the upper edge thereof in substantially laterally juxtaposed relation to the toothed portion 41. The cam surface 38 is contoured into a step-like configuration having a first section 38a and a second section 38b contiguous to the first section 38a and situated rearward (rightward in FIG. 3) of the first section 38a. The first and second cam surface sections 38a, 38b are of circular arc configuration.

The movable clamp unit 15 further includes an operating lever 46 pivotally mounted on the second slider 27 by means of a pin 43, so as to undergo pivotal movement between a first position (initial standby position shown in FIG. 4A) and a second position (clamping position shown in FIG. 6A) through a third position (locking position shown in FIG. 5A) disposed between the first and second positions. The operating lever 46 has a generally Y-shaped configuration including a bifurcated head 46a and a straight leg 46b joined together at a junction where the pin 43 is disposed. One part (upper part in FIG. 3) of the bifurcated head 46a is bent outwardly away from the other part (lower part in FIG. 3) at an intermediate portion thereof and has a first grip portion 47 at a distal end portion thereof. The other part (lower part in FIG. 3) of the bifurcated head 46a is bent inwardly toward the upper part at an intermediate portion thereof and has a second grip portion 48 at a distal end portion thereof. The first grip portion 47 is adapted to be gripped by a human operator when the operating lever 46 is to be moved from the standby position to the clamping position through the locking position.

The operating lever 46 further includes first cam roller 44 rotatably mounted on a distal end of the straight leg 46b of the operating lever 46 for rolling engagement with the first cam surface 34 formed on the extension plate 33, and a second cam roller 45 rotatably mounted on a proximal end portion of the lower part of the bifurcated head 46a of the operating lever 46 for rolling engagement with the second cam surface 38 formed on the lock lever 37. The first and second cam rollers 44 and 45 are arranged to move into and out of engagement with the first and second cam surfaces 34 and 38, respectively, in response to pivotal movement of the operating lever 46 so as to concurrently control relative movement of the first and second sliders 26 and 27 and pivotal movement of the lock lever 37 in a manner described later. The first section 34a of the first cam surface 34 is spaced a first distance from the axis of the pin 43 (i.e., a pivot axis of the operating lever 46), and the second section 34b of the first cam surface 34 is spaced a second distance from the pivot axis 43 of the operating lever 46, the second distance being smaller than the first distance by a distance at least equal to one-half pitch of the teeth of the rack 25 and the toothed portion 41 for a reason described later. On the other hand, the first section 38a of the second cam surface 38 is spaced a first distance from the pivot axis 43 of the operating lever 46, and the second section 38b of the second cam surface 38 is spaced a second distance from the pivot axis 43 of the operating lever 46, the second distance is larger than the first distance.

Figure 4A:
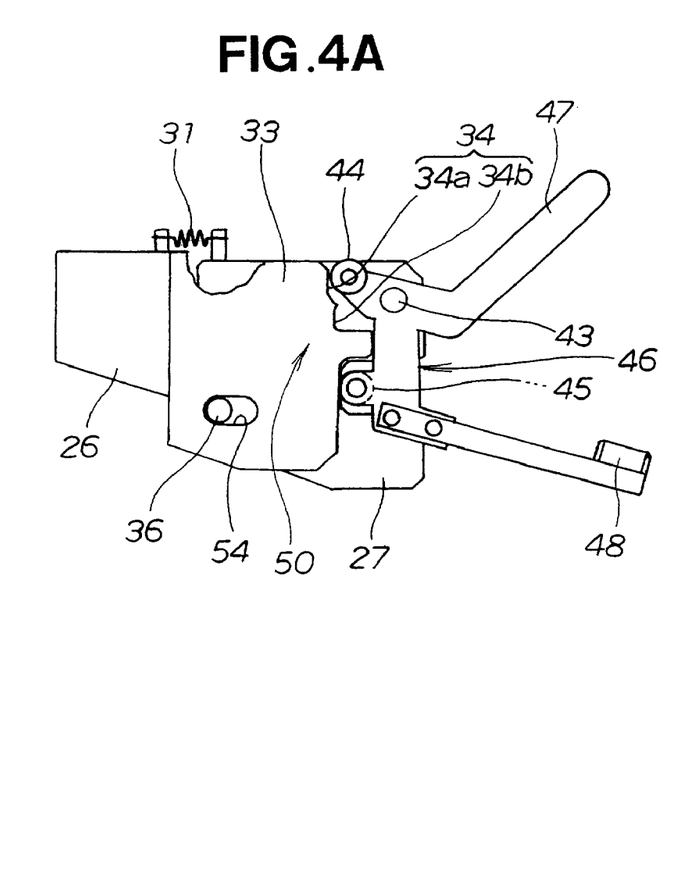
FIGS. 4A and 4B are front elevational views illustrative of the operation of the movable clamp unit when an operating lever of the movable clamp unit is in an initial standby position.
Figure 4B:
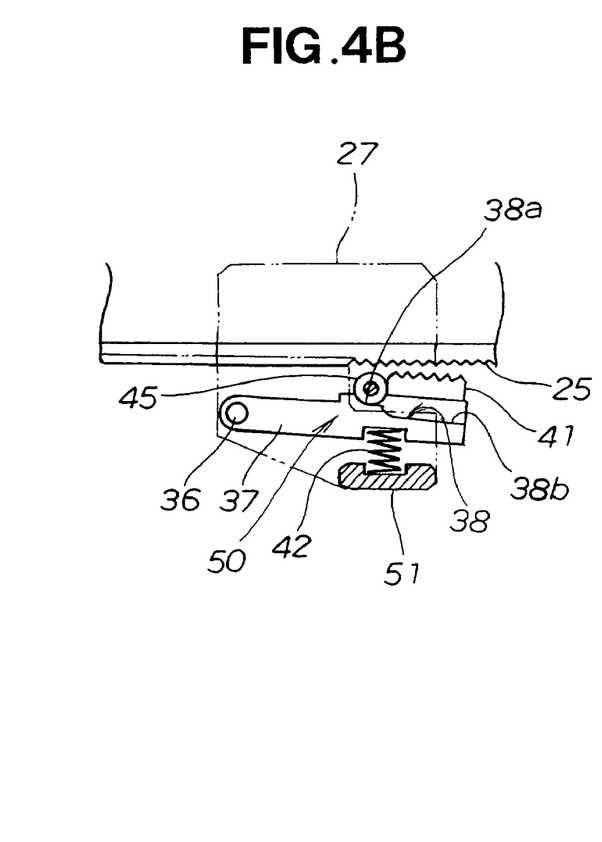

The first and second cam surfaces 34 and 38 and the first and second cam rollers 44 and 45 together form a cam mechanism 50 (FIGS. 4A and 4B). The cam mechanism 50 is operable in response to pivotal movement of the operating lever 46 such that when the operating lever 46 is in the first position (initial standby position shown in FIG. 4a), the lock lever 37 is urged to turn clockwise in FIG. 3 about the axis of the pivot pin 36 against the force of the spring member 42 so as to disengage the toothed portion 41 from the rack 25 to thereby allow the first and second sliders 26 and 27 to be displaced toward the fixed clamp member 13 (FIG. 1), when the operating lever 46 is in the third position (locking position shown in FIG. 5A), the lock lever 37 is allowed to turn counterclockwise in FIG. 3 about the axis of the pivot pin 36 under the force of the spring member 42 to the extent that the toothed portion 41 is in complete mesh with the rack 25 to thereby lock the second slider 27 in position against movement relative to the guide rail 24, and when the operating lever 46 is in the second position (clamping position shown in FIG. 6A), the first slider 26 and the movable clamp member 16 carried thereon are displaced toward the fixed clamp member 13 (FIG. 1) against the resiliency of the resilient connecting member 31 while the second slider 27 remains locked in position on the guide rail 24 via meshing engagement provided between the rack 25 and the toothed portion 41 of the lock lever 37 under the force of the spring member 42. The first and second cam rollers 44 and 45 may be constituted by round portions formed as integral parts of the operating lever 46.

The work carrier 10 of the foregoing construction operates as follows.

The work carrier 10 is normally disposed in a standby position shown in FIG. 2 in which the operating lever 46 of the movable clamp unit 15 is disposed in the first position (standby position) also shown in FIG. 4A. When the operating lever 46 is in this standby position of FIG. 4A, the first cam roller 44 is out of engagement of either of the first and second sections 34a and 34b of the first cam surface 34, while the second cam roller 45 is in engagement with the first section 38a of the second cam surface 38, as shown in FIG. 4B, so that the lock lever 37 is urged to turn clockwise in FIG. 4B about the axis of the pivot pin 36 against the force of the spring member 42 to thereby disengage the toothed portion 41 from the rack 25.

In this condition, the first grip portion 47 of the operating lever 46 is oriented to slant upwardly to the horizontal, while the second grip portion 48 of the operating lever 46 is oriented to slightly slant downwardly to the horizontal. The angle of inclination of the second grip portion 48 is much smaller than the angle of inclination of the first grip portion 47. The first slider 26 and the second slider 27 are urged toward each other by the force of the tension coil spring 31 until the pivot pin 36 extending through the second slider 27 comes in engagement with a left end of the elongated hole 54 formed in the extension plate 33 of the first slider 26. Within a longitudinal extent or length of the elongated hole 54, the first and second sliders 26 and 27 are relatively movable in a direction away from each other against the force of the tension coil spring 31.

Figure 5A:
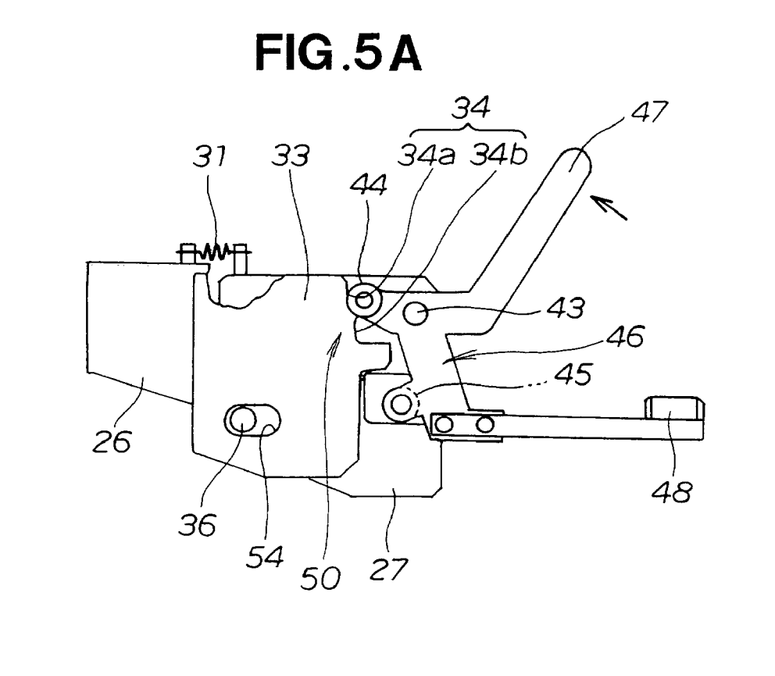
FIGS. 5A and 5B are views similar to FIGS. 4A and 4B, respectively, but showing the operation of the movable clamp unit when the operating lever is in a locking position.
Figure 5B:
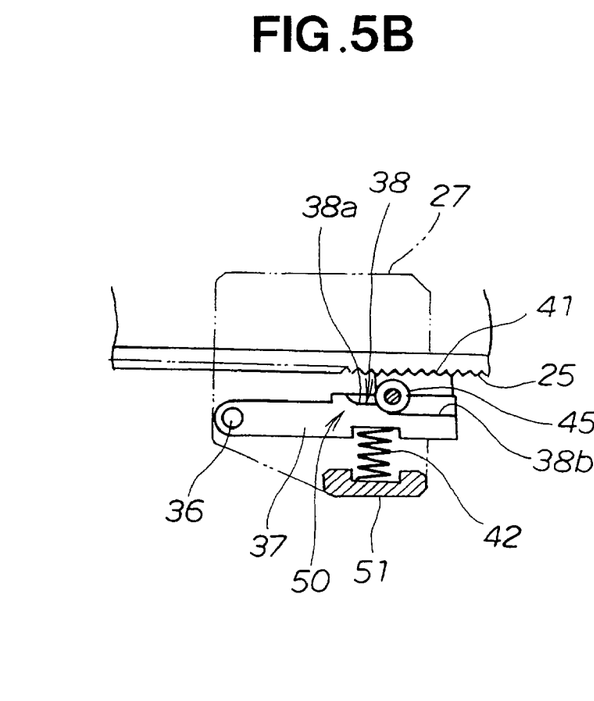

In the standby position shown in FIGS. 4A and 4B, since the toothed portion 41 of the lock lever 37 is kept disengaged from the rack 25 on the support plate 22, the first and second sliders 26 and 27 are slidably movable toward and away from the clamp member 13 (FIG. 1) of the fixed clamp unit 12 when a human operator displaces the operating lever 46 in a desired direction along the guide rail 24 (FIG. 2) while gripping either of the first and second grip portions 47 and 48. In practice, the second grip portion 48 is gripped by the human operator. This is because due to the inclination angle of the second grip portion 48 which is much smaller than the inclination angle of the first grip portion 47, a force applied from the human operator for the purpose of moving the first and second sliders 26 and 27 in a horizontal direction is efficiently transmitted to the second slider 27 when applied to the operating lever 46 through the second grip portion 48. If the force from the human operator is applied through the first grip portion 47 to the operating lever 46, the operating lever 46 may be turned about the pin 43 in a direction to move the first and second cam rollers 44 and 45 in a different position such as shown in FIGS. 5A and 5B where the toothed portion 41 of the lock lever 37 is in mesh with the rack 25.

When a vehicle door 14 (FIG. 1) is to be carried on the work carrier 10, the first and second sliders 26 and 27 of the movable clamp unit 15 are displaced rightward in FIGS. 4A and 4B by pulling the second grip portion 48 of the operating lever 46 rightward so that the movable clamp member 16 supported on the first slider 26 is displaced far away from the clamp member 13 of the fixed clamp unit 12. Then, the vehicle door 14 is placed on the work carrier 10 in such a manner that a front vertical edge 14a of the vehicle door 14 is held inside the groove 13a of the clamp member 13 and the lower edge 14c of the vehicle door 14 is snugly received in the grooves 17a, 18a of the support members 17, 18.

Then, by pushing the second grip portion 48 of the operating lever 46 leftward in FIGS. 4A and 4B, the first and second sliders 26 and 27 are forced to move toward clamp member 13 of the fixed clamp unit 12 until the clamp member 16 supported on the first slider 27 comes in fitting engagement with a rear vertical edge 14b of the vehicle door 14 so that the rear vertical door edge 14b is snugly received in the groove 16a of the clamp member 16.

Subsequently, while gripping the first grip portion 47 of the operating lever 46, the human operator turns the operating lever 46 about the pin 43 in the counterclockwise direction shown in FIG. 4A until the operating lever 46 arrives at a third position (locking position) shown in FIG. 5A. In response to this pivotal movement of the operating lever 46, the first cam roller 44 comes in rolling engagement with the first section 34a of the first cam surface 34 as show in FIG. 5A, while at the same time, the second cam roller 45 comes in rolling contact with the second section 38b of the second cam surface 38, as shown in FIG. 5B. In this instance since the second section 38b of the second cam surface 38 is spaced a larger distance from the pin 43 (pivot axis) of the operating lever 46 than the first section 38a of the second cam surface 38, the lock lever 37 is allowed to turn counterclockwise in FIG. 5B about the pivot pin 36 to the extent that the toothed portion 41 of the lock lever 37 is in complete mesh with the rack 25 on the support plate 22 (FIG. 3). By virtue of the meshing engagement between the toothed portion 41 and the rack 25, the second slider 27 is locked in position against movement relative to the guide rail 24 (FIG. 3).

Figure 6A:
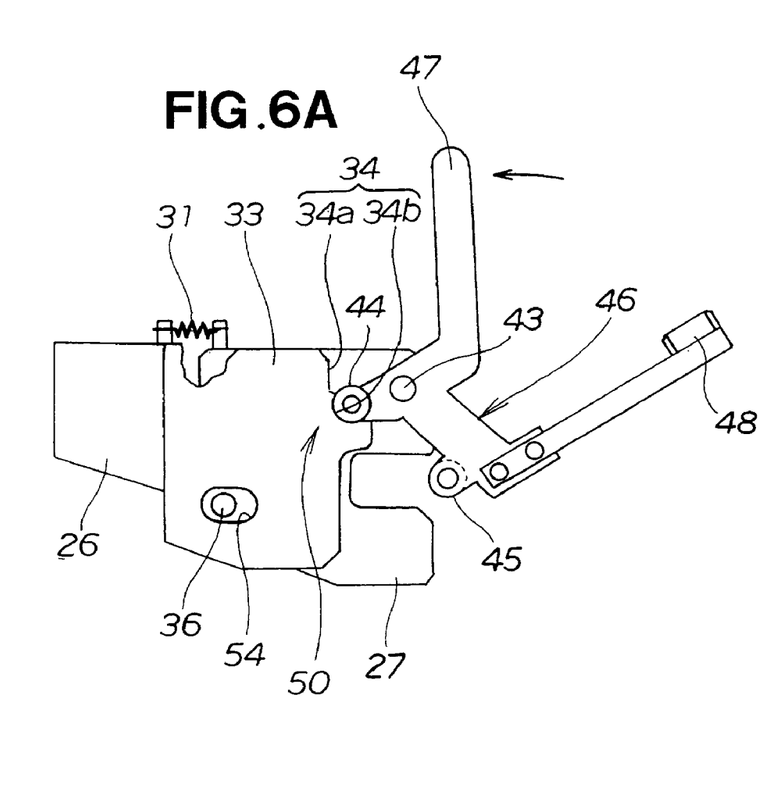
FIGS. 6A and 6B are views similar to FIGS. 4A and 4B, respectively, but showing the operation of the movable clamp unit when the operating lever is in a clamping position.

During pivotal movement of the operating lever 46 from the standby position shown in FIG. 4A to the locking position shown in FIG. 6A, it may occur that the toothed portion 41 approaches the rack 24 with tooth tips of the toothed portion 41 aligned with tooth tips of the rack 25. In this instance, since the toothed portion 41 is urged to move into meshing engagement with the rack 25 under the force of the compression coil spring 42, teeth of the toothed portion 41 tend to slide either along left-side flanks of mating teeth of the rack 25 or along right-side flanks of the mating teeth of the rack 25. However, partly because movement of the first slider 26 in the leftward direction is prevented by abutting engagement between the clamp member 16 of the movable clamp unit 15 and the rear vertical edge 14b of the vehicle door 14, and partly because movement of the second slider 27 in the leftward direction is prevented by engagement between the pivot pin 36 on the lock lever 37 and the left end of the elongated hole 54 (FIG. 4A) in the extension plate 33 of the first slider 26, the lock lever 37 and the second slider 27 are displaced rightward by a distance equal to one-half pitch of the teeth of the rack 25 and the toothed portion 41, allowing the toothed portion 41 to move into complete mesh with the rack 25, as shown in FIG. 5B. The second slider 27 is now locked in position on the guide rail 24 (FIG. 3) through meshing engagement between the toothed portion 41 and the rack 25.

In this instance, since the first slider 26 and the second slider 27 are urged toward each other by the force of the tension coil spring 31, the aforesaid rightward displacement of the second slider 27 also causes rightward movement of the first slider 26 by the same distance which is equal to one-half pitch of the teeth of the rack 25. This means that the clamp member 16 supported on the first slider 26 is displaced in the rightward direction and separated from the rear vertical edge 14b of the vehicle door 14 by a distance which is equal to one-half pitch of the teeth of the rack 25 and the toothed portion 41.

Figure 6B:
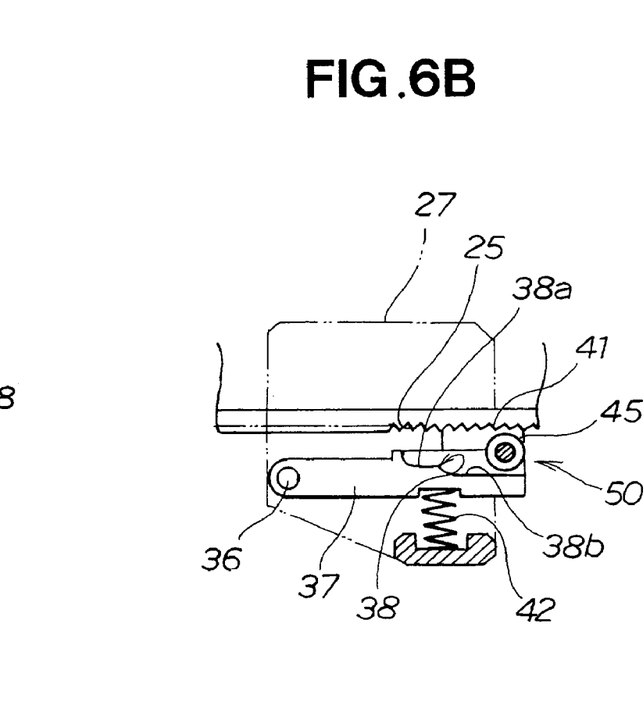

Then, while gripping the first grip portion 47 of the operating lever 46, the human operator further turns the operating lever 46 in the counterclockwise direction shown in FIG. 4A until the operating lever 46 arrives at a second position (clamping position) shown in FIG. 6A. In response to this pivotal movement of the operating lever 46, the first cam roller 44 comes in rolling engagement with the second section 34b of the first cam surface 34 as shown in FIG. 6A, while at the same time, the second cam roller 45 moves out of engagement with either of the first section 38a and the second section 38b of the second cam surface 38, as shown in FIG. 6B. In this instance, since the second section 34b of the first cam surface 34 is spaced a smaller distance from the pin 43 (pivot axis) of the operating lever 46 than the first section 34a of the first cam surface 38 by a distance at least equal to one-half pitch of the teeth of the rack 25 and the toothed portion 41, the first slider 26 integral with the extension plate 33 is forcibly displaced leftward in FIG. 6A against the force of the tension coil spring 31 by a distance at least equal to one-half pitch of the teeth of the rack 25 and the toothed portion 41. During that time, the second slider 27 remains locked in position on the guide rail 24 (FIG. 3) via meshing engagement provided between the rack 25 and the toothed portion 41 of the lock lever 37 under the force of the compression coil spring 42.

With this forcible leftward movement of the first slider 26, the clamp member 16 supported on the first slider 26 is also displaced leftward by a distance at least equal to one-half pitch of the teeth of the rack 25 and the toothed portion 41. By thus displacing the clamp member 16 of the movable clamp unit 15 toward the clamp member 13 of the fixed damp unit 12, the vehicle door 14 can be firmly clamped between the clamp member 13 of the fixed clamp unit 12 and the clamp member 16 of the movable clamp unit 15 even if the second slider 27 (FIG. 3) has been locked in position on the guide rail 24 with the clamp member 16 spaced from the rear edge 14b of the vehicle door 14 by a distance equal to one-half pitch of the teeth of the rack 25 and the tooth portion 41 of the lock lever 37. In this clamped condition, by virtue of the engagement between the second section 34b of the first cam surface 34 and the first cam roller 44, the first slider 26 is prevented from moving in the rightward direction shown in FIG. 6A with the result that the clamp member 16 supported on the first slider 26 is held in a desired clamping position even when subjected to a severe horizontal force that may occur at the starting and stopping of the work carrier 10. Thus, the vehicle door 14 clamped between the fixed and movable clamp units 12 and 15 can remain in a desired position throughout the conveyance by the work carrier. This ensures that at an assembling station, a window glass and other parts can be assembled with the door with sufficient accuracy.

When the vehicle door 14 is to be removed from the work carrier 10, the operating lever 46 is returned from the clamped position of FIG. 6A to the initial standby position of FIG. 4A. To this end, the second grip portion 48 is pushed downward to turn the operating lever 46 about the pin 43 in the clockwise direction in FIG. 6A until the operating lever 46 assumes the initial standby position of FIG. 4A where the first cam roller 44 is disengaged from either of the first and second cam sections 34a and 34b of the first cam surface 34, allowing the first and second sliders 26 and 27 to move toward each other under the force of the tension coil spring 31. At the same time, the second cam roller 45 comes into engagement with the first section 38a of the second cam surface 38, causing the lock lever 37 to turn clockwise about the pivot pin 36 against the force of the compression coil spring 42 to thereby disengage the toothed portion 41 from the rack 25. Then, the second grip portion 48 of the operating lever 46 is pulled rightward in FIG. 4A to move the first and second sliders 26 and 27 in the same direction so that the clamp member 16 supported on the first slider 26 is displaced rightward away from the rear vertical edge 14b of the vehicle door 14 (FIG. 1). The vehicle door 14 is then removed from the work carrier 10 and transferred to a subsequent processing station.

In order to allow the human operator to move the operating lever from the clamping position of FIG. 6A to the initial standby position of FIG. 4 with smaller muscular effort, the first and second grip portions 47 and 48 of the operating lever 46 are arranged at an angle to one another such that when the operating lever 46 is in the clamping position of FIG. 6A, the first grip portion 47 leis in a substantially vertical plane and the second grip portion 48 lies in a plane slightly inclined to the horizontal. With this arrangement, a downward force which is required to turn the operating lever 46 in the clockwise direction by depressing the second grip portion 48 is much smaller than a horizontal force which is required to turn the operating lever 46 in the clockwise direction by turning the first grip portion 47 in the clockwise direction. The first grip portion 47 and the second grip portion 48 may be arranged at right angles to each other in which instance the second grip portion 48 lies in a substantially horizontal plane when the operating lever 46 is in the clamping position. Such angled arrangement of the first and second grip portions 47 and 48 improves the efficiency of the unclamping operation.

The work carrier 10 may be used with other vehicle components including bonnets or hoods, sunroofs, window glasses and the like.

INDUSTRIAL APPLICABILITY

With the arrangements so far described, the present invention can be used advantageously as a work carrier used in an automobile assembly line for conveyance of a plate-like work, such as vehicle door, to an assembling station where a window glass and other parts are assembled with the door.

The invention claimed is:

1. A work carrier for carrying a plate-like work with the work held in an upright position, the work carrier comprising:
a fixed clamp unit having a first clamp member for holding a vertical edge of the work; and
a movable clamp unit having a second clamp member disposed opposite to the first clamp member for holding another vertical edge of the work,
wherein the movable clamp unit comprises:
a horizontal guide rail mounted to extend toward the first clamp member;
a rack extending parallel to the guide rail;
a first slider and a second slider that are slidably mounted on the guide rail with the first slider situated nearer the first clamp member in relation to the second slider, the first slider supporting thereon the second clamp member;
a resilient member resiliently connecting together the first slider and the second slider;
a lock lever pivotally mounted on the second slider and having a toothed portion engageable with the rack for locking the second slider in position against movement relative to the guide rail;
a spring member acting between the second slider and the lock lever and urging the lock lever to turn in a first direction to move the toothed portion of the lock lever into meshing engagement with the rack;
an operating lever pivotally mounted on the second slider to undergo pivotal movement between a first position and a second position through a third position disposed between the first and second positions; and
a cam mechanism operable in response to pivotal movement of the operating lever such that when the operating lever is in the first position, the lock lever is urged to turn in a second direction opposite to the first direction against the force of the spring member so as to disengage the toothed portion from the rack to thereby allow the first and second sliders to be displaced toward and away from the first clamp member, when the operating lever is in the third position, the lock lever is allowed to turn in the first direction under the force of the spring member to the extent that the toothed portion is in complete mesh with the rack to thereby lock the second slider in position against movement relative to the guide rail, and when the operating lever is in the second position, the first slider and the second clamp member are displaced toward the first clamp member against the resiliency of the resilient member while the second slider remains locked in position on the guide rail via meshing engagement provided between the rack and the toothed portion under the force of the spring member.

2. The work carrier as recited in claim 1, wherein the cam mechanism includes a first cam surface formed on the first slider, a second cam surface formed on the lock lever, and a first cam roller and a second cam roller that are rotatably mounted on the operating lever for rolling engagement with the first cam surface and the second cam surface, respectively, the first and second cam surfaces and the first and second cam rollers being arranged to move into and out of engagement with each other in response to pivotal movement of the operating lever so as to concurrently control pivotal movement of the lock lever and displacement of the first slider relative to the second slider.

3. The work carrier as recited in claim 2, wherein the first cam surface is contoured into a step-like configuration and has a first section and a second section contiguous to the first section and spaced a smaller distance from a pivot axis of the operating lever than the first section, and the second cam surface is contoured into a step-like configuration and has a first section and a second section contiguous to the first section and spaced a larger distance from the pivot axis of the operating lever than the first section of the second cam surface, and wherein when the operating lever is in the first position, the first cam roller is out of engagement with either of the first and second sections of the first cam surface while the second cam roller is in engagement with the first section of the second cam surface, when the operating lever is in the third position, the first cam roller is in engagement with the first section of the first cam surface while the second cam roller is in engagement with the second section of the second cam surface, and when the operating lever is in the second position, the first cam roller is in engagement with the second section of the first cam surface while the second cam roller is out of engagement with either of the first and second sections of the second cam surface.

4. The work carrier as recited in claim 3, wherein the second section of the first cam surface is spaced a first distance from the pivot axis of the operating lever and the first section of the first cam surface is spaced a second distance from the pivot axis of the operating lever, the first distance is smaller than the first distance by least by a distance equal to one-half pitch of teeth of the rack and the toothed portion of the lock lever.

5. The work carrier as recited in claim 3, wherein the first and second sections of the first cam surface and the first and second sections of the second cam surface have a circular arc-shaped configuration.

6. The work carrier as recited in claim 2, wherein the operating lever has a first grip portion for gripping by a human operator to turn the operating lever in a first direction to move the operating lever from the first position through the third position to the second position for clamping the work, and a second grip portion for gripping by the human operator to turn the operating lever in a second direction opposite to the first direction to cause the operating lever to return from the second position to the first position for unclamping the work, the second grip portion being disposed below the first grip portion and extending at an angle to the first grip portion such that when the operating lever is in the second position, the first grip portion lies in a substantially vertical plane and the second grip portion lies in a substantially horizontal plane.

7. A method of clamping a plate-like work using the work carrier of claim 1, comprising the steps of:

while the operating lever is kept in the first position, pulling the operating lever in a first horizontal direction to move the first and second sliders concurrently in a backward direction away from the first clamp member until that the second clamp member is spaced from the first clamp member by a distance large enough to accommodate a plate-like work to be carried on the work carrier;

then, placing the plate-like work on the work carrier such that the plate-like work is accommodated within a space defined between the first and second clamp members with one vertical edge of the plate-like work held by the first clamp member;

subsequently, while the operating lever is kept in the first position, forcing the operating lever in a second horizontal direction to advance the first and second sliders concurrently toward the first clamp member until that the second clamp member comes in abutment with another vertical edge of the plate-like work;

then, turning the operating lever in a first direction to move the operating lever from the first position to the third position to thereby cause the cam mechanism to operate in such a manner as to allow the lock lever to turn in a direction under the force of the spring member to the extent that the toothed portion is in complete mesh with the rack to thereby lock the second slider in position against movement relative to the guide rail; and finally, further turning the operating lever in the first direction to move the operating lever from the third position to the second position to thereby cause the cam mechanism to operate in such a manner as to forcibly displace the first slider and the second clamp member toward the first clamp member against the resiliency of the resilient member while the second slider remains locked in position on the guide rail via meshing engagement provided between the rack and the toothed portion under the force of the spring member, thereby clamping the plate-like work between the first and second clamp members.

8. The method as recited in claim 7, wherein the amount of displacement of the first slider and the second clamp member resulting from pivotal movement of operating lever from the third position to the second position is at least equal to one-half pitch of the teeth of the rack and the tooth portion of the lock lever.

\* \* \* \* \*